March 15, 1938.  W. OWEN  2,111,370

APPARATUS FOR BENDING GLASS SHEETS

Filed Dec. 19, 1936  5 Sheets-Sheet 1

INVENTOR.
WILLIAM OWEN
BY Bradley & Bee
ATTORNEYS.

March 15, 1938.  W. OWEN  2,111,370
APPARATUS FOR BENDING GLASS SHEETS
Filed Dec. 19, 1936  5 Sheets-Sheet 2

INVENTOR.
WILLIAM OWEN
BY Bradley & Bee
ATTORNEYS.

INVENTOR.
WILLIAM OWEN
BY Bradley & Bee
ATTORNEYS.

March 15, 1938.  W. OWEN  2,111,370
APPARATUS FOR BENDING GLASS SHEETS
Filed Dec. 19, 1936   5 Sheets-Sheet 4

INVENTOR.
WILLIAM OWEN
BY Bradley & Bee
ATTORNEYS.

March 15, 1938.  W. OWEN  2,111,370
APPARATUS FOR BENDING GLASS SHEETS
Filed Dec. 19, 1936   5 Sheets-Sheet 5
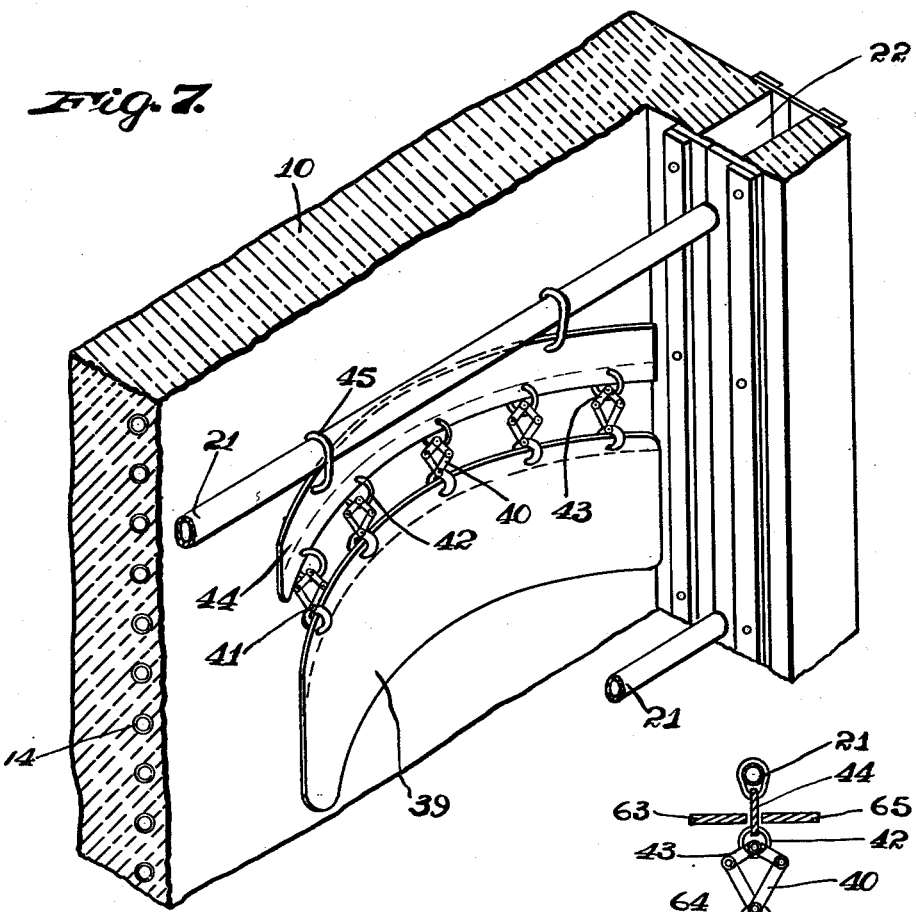
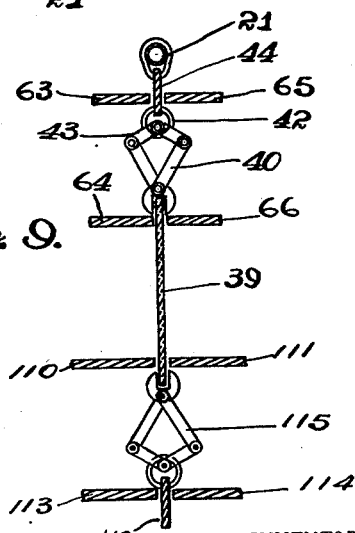
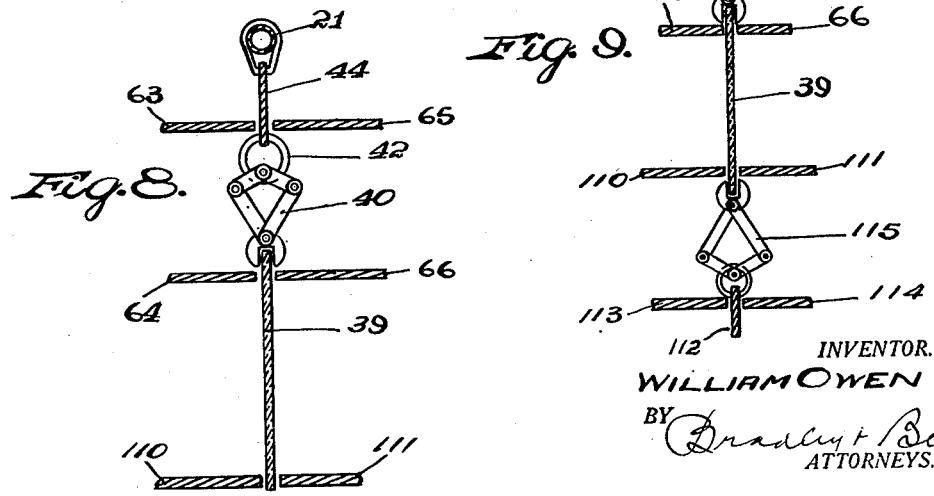
INVENTOR.
WILLIAM OWEN
BY Bradley & Bee
ATTORNEYS.

Patented Mar. 15, 1938

2,111,370

UNITED STATES PATENT OFFICE 2,111,370

APPARATUS FOR BENDING GLASS SHEETS

William Owen, Pittsburgh, Pa., assignor to Pittsburgh Plate Glass Company, Allegheny County, Pa., a corporation of Pennsylvania Application December 19, 1936, Serial No. 116,732

8 Claims. (Cl. 49—7)

Figure 1:
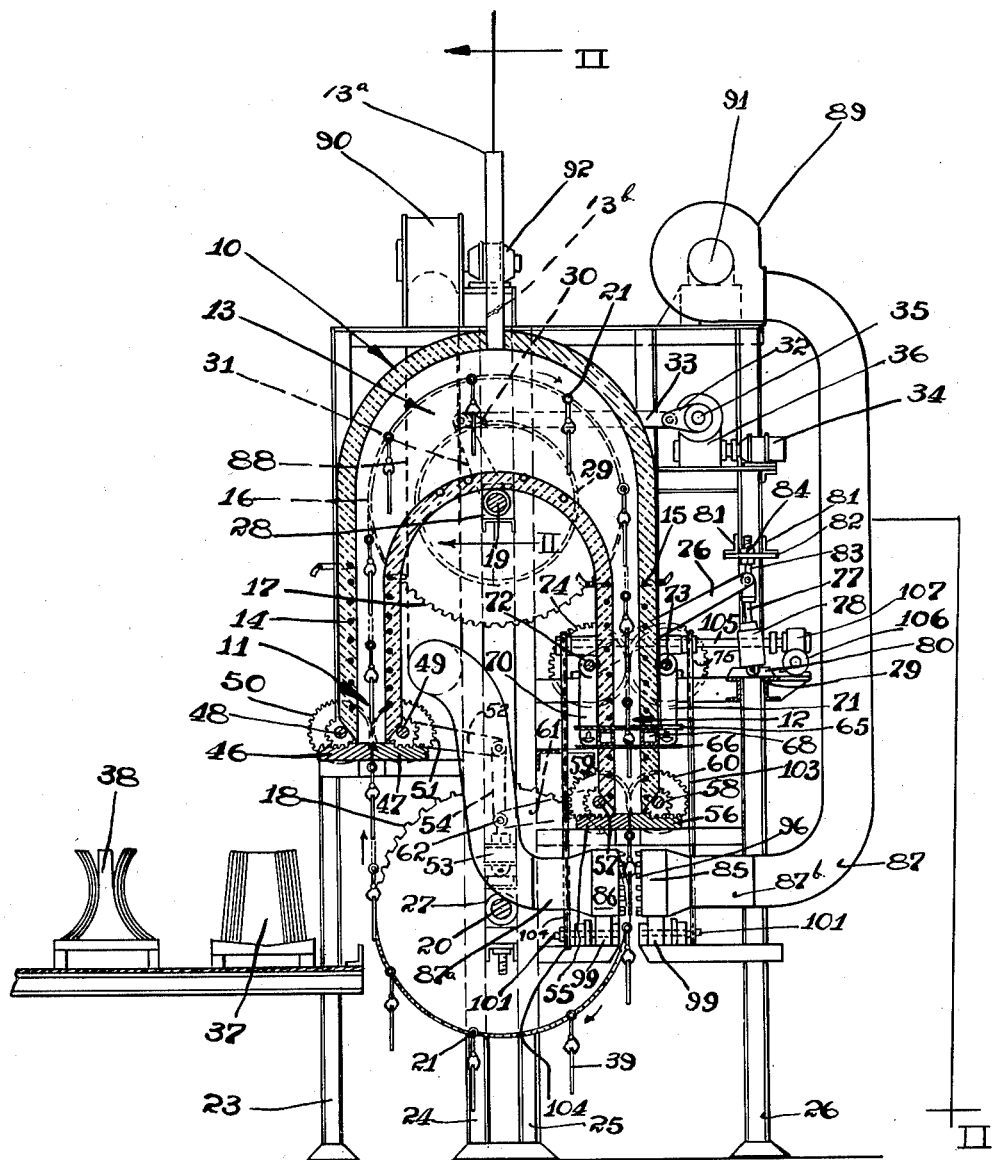
Figure 2:
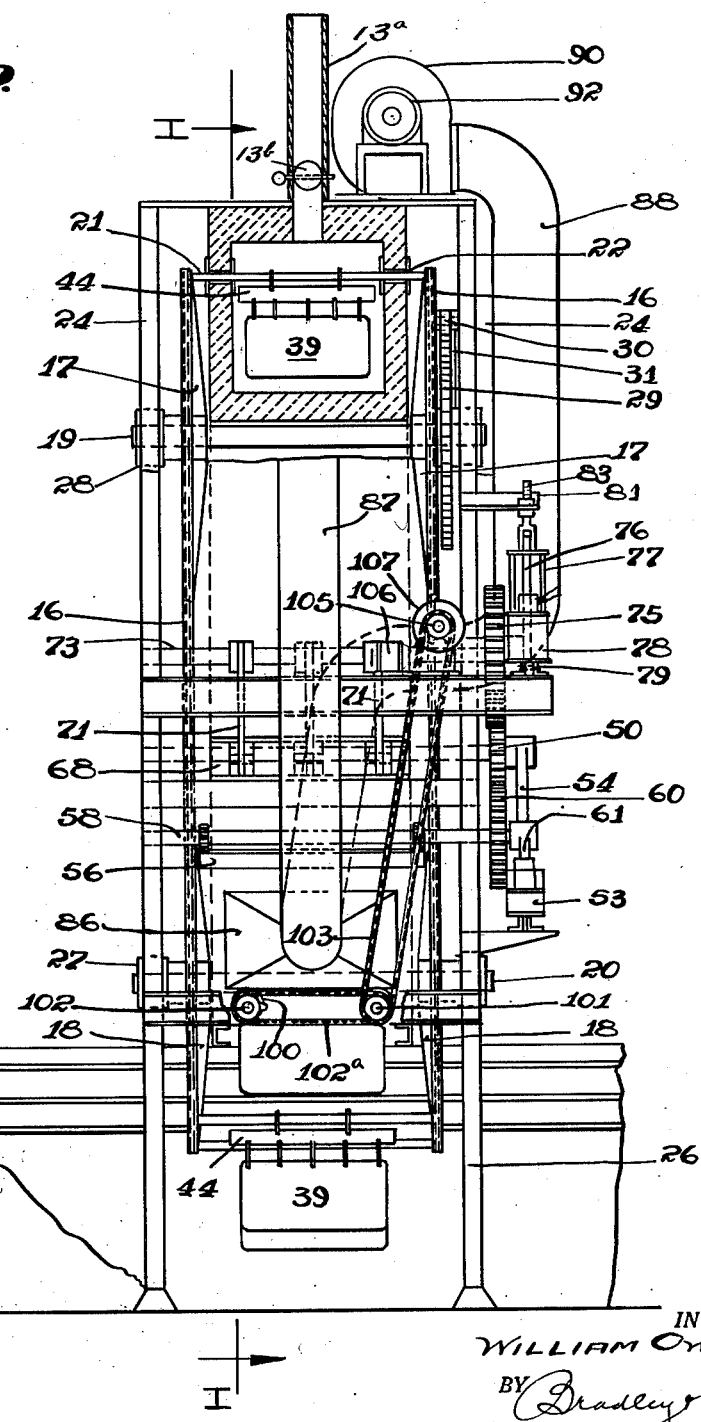
Figure 3:
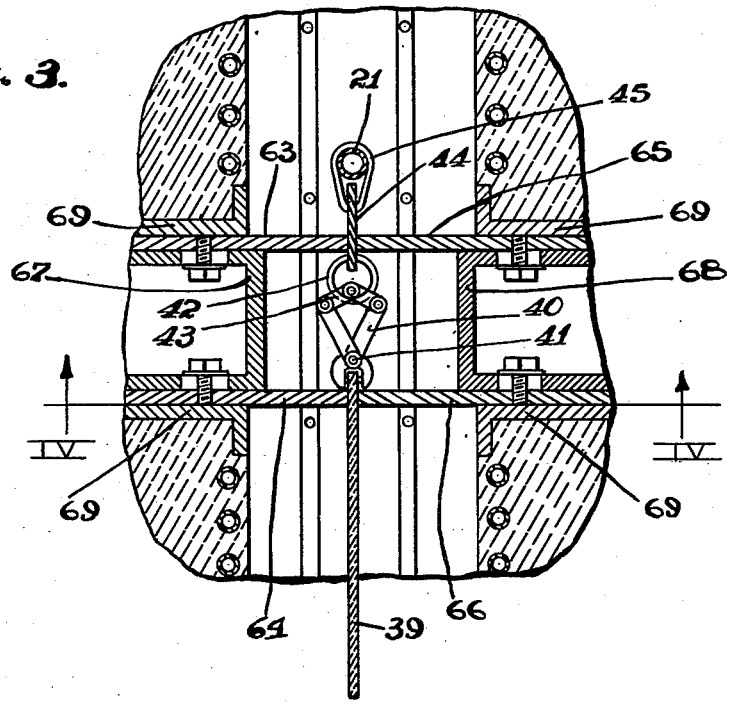
Figure 4:
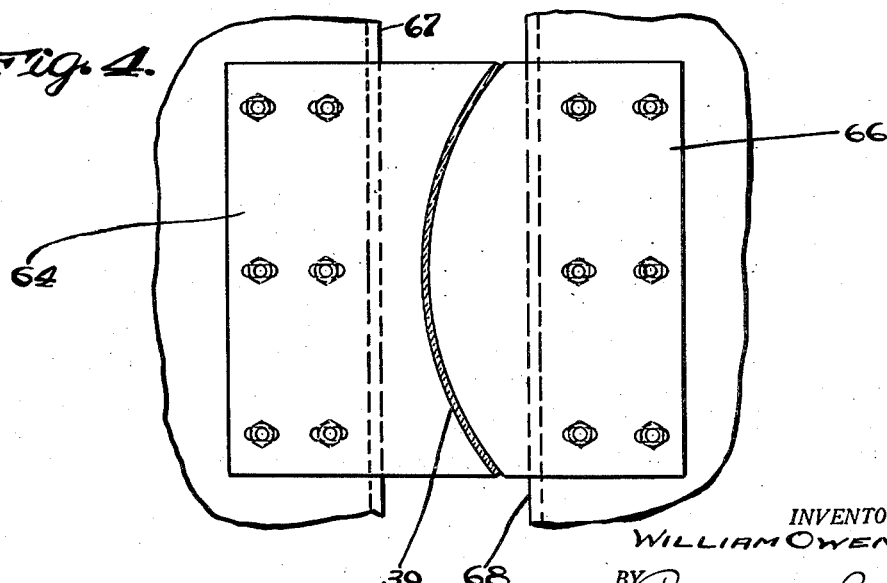
Figure 5:
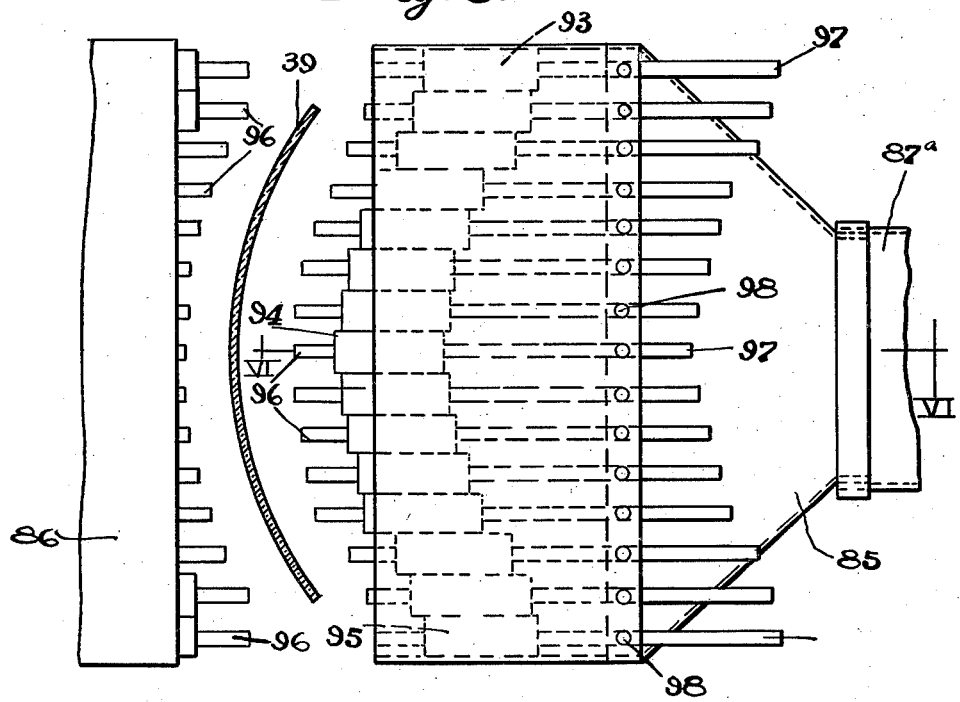
Figure 6:
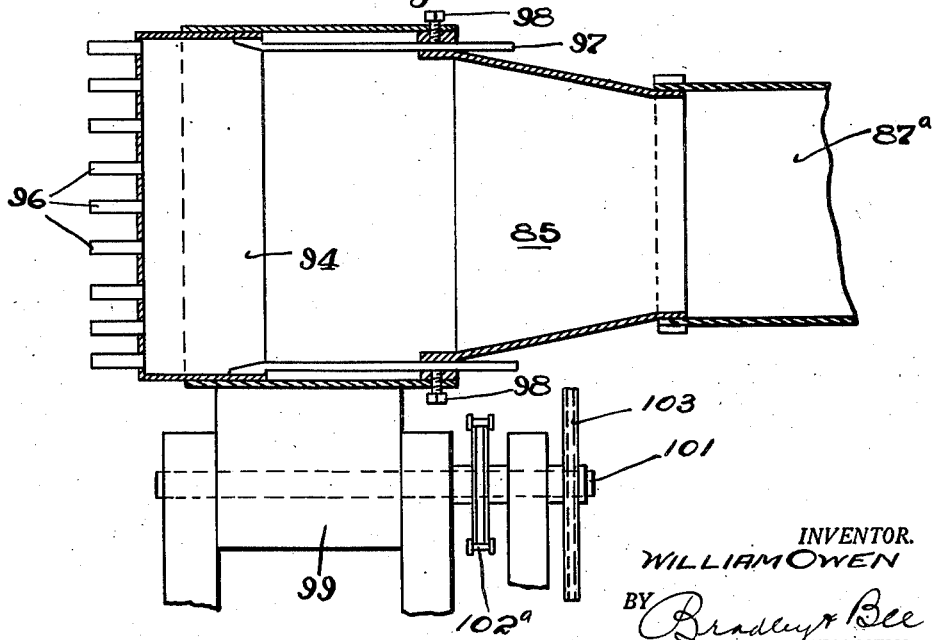

The invention relates to an apparatus for bending glass sheets, and involves a modification of the apparatus shown in my copending application, Serial No. 114,962 filed December 9, 1936, with which it has a number of features in common. The object of the present invention is the provision of an apparatus which occupies only a small amount of space, as compared with that required for the apparatus of my application above referred to, and which permits of rapid production with a minimum of labor. In carrying out the invention, an upright tunnel kiln of inverted U form is employed with an endless conveyor traveling therethrough, and after the bending operation, the sheets are case hardened by the use of suitable air blast means in advance of the bending means exterior of the kiln. The case hardening step obviates the necessity of annealing the bent sheets, as would otherwise be necessary, and gives a stronger product than an annealed sheet. The substitution of the case hardening step for an annealing step, speeds up the operation and reduces the length of the tunnel kiln to a fraction of what would be required if the sheets had to be annealed. Certain embodiments of the invention are illustrated in the accompanying drawings, wherein:

Figure 1 is a vertical section on the line I—I of Fig. 2. Fig. 2 is in part a side elevation and in part a section on the line II—II of Fig. 1. Figs. 3 and 4 are enlarged detail views of the bending device, Fig. 3 being a vertical section and Fig. 4 a transverse section on the line IV—IV of Fig. 3. Figs. 5 and 6 are enlarged detail views of the air blast chilling means, Fig. 5 being a plan view and Fig. 6 a vertical section on the line VI—VI of Fig. 5. Fig. 7 is an enlarged detail perspective view showing the method of supporting the glass sheet. And Figs. 8 and 9 are sectional views through modified forms of bending devices.

Referring to the drawings, 10 is a tunnel kiln through which the glass sheets to be bent are moved upon an endless carrier, such kiln having an entrance end 11, a bending and outlet end 12, and an intermediate portion 13 of enlarged cross section, such kiln being in the form of an inverted U, as indicated in Fig. 1. In order to provide for the heating of the kiln, two sets of electrical resistance elements 14 and 15 are embedded in the walls, the temperature control being such that the glass sheets in passing from the entrance end 11 to the bending end 12 are gradually heated to the softening point. A stack 13a having a damper 13b is provided at the top of the kiln.

Glass sheets are carried through the kiln in suspended position upon an upright endless conveyor consisting of a pair of chains 16, 16 passing at their ends around the sprockets 17, 17 and 18, 18 mounted on the shafts 19 and 20. The two chains are connected at intervals by transverse hollow bars 21 upon which the glass sheets are hung. The sides of the leer wall are provided with slots 22, 22 (Fig. 2) for the passage of the bars; the chains, sprockets and driving mechanism for the endless carrier being located exteriorly of the kiln. This operating mechanism is carried by a framework of commercial channels consisting of the vertical channels 23, 24, 25 and 26 suitably tied together by transverse members, as indicated in Figs. 1 and 2, the shafts 19 and 20 which carry the sprockets being mounted in suitable bearings 27 and 28 located between the channels 24 and 25.

Because of the intermittent character of the bending operation, as later described, the carrier must be given an intermittent step by step motion, and this is accomplished by a pawl and ratchet mechanism, including the ratchet wheel 29 keyed to the shaft 19 and the pawl 30 pivoted to the end of the arm 31 journalled upon the shaft 19. This arm is swung back and forth by means of the crank 32 and connecting rod 33. The crank is given a slow movement of rotation from the motor 34 which drives the crank shaft 35 through the intermediary of suitable reduction gearing of the worm and wheel type located in the casing 36. Through this operating mechanism the conveyor is given a step by step movement, the conveyor being moved in the direction of the arrow as the connecting rod 33 moves to the right. On the reverse movement of the connecting rod, the arm 31 is moved back to starting position, thus providing a period of rest between movements of the carrier, during which the pressing and case hardening operations, later described, are performed.

The flat sheets of glass which are to be bent are brought to a point adjacent the inlet end of the kiln on racks 37, at which point the operator removes them one by one and attaches them to the conveyor, the sheets which have been bent being removed at this point and placed upon the racks 38. The method of supporting the glass sheets 39 from their upper edges is shown in Fig. 7. Each sheet is engaged by a plurality of gripping means comprising the arms 40 pivoted together at 41 and connected to the loops 42 by means of the links 43, so that the weight of the glass sheet tends to close the gripping devices whose lower ends are provided with sharp points to insure engagement with the glass. The loops are carried by a sheet metal plate 44 which lies in the same plane as the glass sheet, it being understood at this point that the plate 44 is flat preliminary to the bending operation. The metal plates 44 are in turn supported upon the bars 21 by the loops 45, which connection leaves the plates 44 free to bend. This method of support is the same as that disclosed in my application heretofore referred to.

After each sheet passes into the kiln, the entrance end thereof is closed by means of a pair of doors 46 and 47 mounted for movement of approach in a horizontal direction in suitable guideways. These doors are provided upon their upper sides with racks which are engaged by pinions carried upon the shafts 48 and 49. These shafts have keyed to them the intermeshing pinions 50 and 51, so that the oscillation of one of the pinions will result in the back and forth movement of the doors 46 and 47. This oscillation is accomplished by means of an arm 52 keyed to the shaft 49 and having its end connected to an electric thruster 53 by means of the connecting rod 54. The operation of the thruster is timed so that when the movement of the conveyor stops, the doors 46 and 47 move toward each other and close the opening at the end of the kiln and when the conveyor starts the doors move apart to permit the passage of the next sheet of glass and its supporting devices. The outlet end of the kiln is provided with another pair of doors 55 and 56 similarly operated by pinions on the shafts 57 and 58, such shafts carrying intermeshing gears 59 and 60 corresponding to the gears 50 and 51. The shaft 57 has keyed to it an operating arm 61 whose end is pivoted to the plunger of the thruster at 62. The two sets of doors at the inlet and outlet ends are thus moved simultaneously in their opening and closing movements.

When the glass sheets arrive at the outlet end of the kiln, they are at a temperature approximating softening point and in condition to be bent. The bending operation is accomplished by means of pairs of plates 63, 64, and 65, 66 (Fig. 3) mounted for sliding movement transversely of the kiln, the edges of the plates 63 and 64 being curved reversely from those of the plates 65 and 66, as indicated in Figs. 3 and 4, and such plates having a curvature corresponding to that to which the glass sheets are to be bent. The plates are bolted adjustably to the brackets 67 and 68, which slide between the pairs of channels 69, 69, constituting a part of the kiln construction. These brackets 67 and 68 are moved toward and from each other at timed intervals by sets of lever arms 70 and 71 mounted on the shafts 72 and 73. The shafts are caused to rotate oppositely in unison by means of the intermeshing gears 74 and 75 keyed to the shafts, and the shaft 72 is oscillated by means of the arm 76 whose upper end is connected to the plunger 77 of an electric thruster 78. This thruster is pivoted at 79 to a bracket 80 secured to the framework of the kiln. In order to limit the movement of the thruster and prevent the application of undue pressure upon the glass sheets by the plates 64 and 66, stop mechanism is provided in the form of the angles 81 fixed to the framework and the plate 82 (Fig. 1) mounted for movement with the thruster plunger. This plate is carried by a threaded rod 83 secured to the upper end of the plunger and provided with adjusting nuts 84 to regulate the stop position. In the bending operation, the plates 63, 64 and 65, 66 approach each other and bend the metal plate 44 and the upper edge of the glass plate to the curvature indicated in Figs. 4 and 7. Due to the soft condition of the glass, the bending of the upper edge of the glass plate causes a similar bending of the portions of the plate therebeneath. Further, due to the soft condition of the glass, there is no tendency of the metal plate 44 or the glass plate 39 to depart from their bent positions after the bending device has its parts separated.

The case hardening of the glass sheets is accomplished just below the outlet end of the kiln and involves the use of two headers 85 and 86 (Fig. 1), to which air is supplied through the pipes 87 and 88 from the blowers 89 and 90, such blowers being mounted upon the top of the framework of the kiln and driven from the motors 91 and 92. The headers are connected to the supply pipes 87 and 88 by rubber sleeves 87a and 87b to permit the up and down movement of the headers, as later described. Each header is provided with a series of elongated boxes 93, 94, 95, etc. (Fig. 5) spaced side by side and adjustable horizontally. Each box is provided with a plurality of nozzles 96 arranged in a vertical series so as to cover the vertical dimension of the glass sheet. Each box is provided with a pair of rods 97 (Fig. 5) extending rearwardly through the header casing, such rods being held in adjusted position by means of the set screws 98. This gives a header which is adjustable to suit various curvatures of glass so that the ends of the nozzles are all at the same distance from the surface thereof. It also provides a means whereby the position of the nozzles can be easily and conveniently adjusted from the exterior of the header. It will be understood that the construction of the header 86 shown in Fig. 5 is the same as that of the header 85 except that in the one case the nozzles correspond to the convex curvature of the sheet and in the other case they correspond to the concave curvature thereof. The intermittent movement of the conveyor is such that after the bending operation, the next movement carries the bent sheet past the doors 55 and 56 into position between the air blast nozzles, so that the operations of bending one sheet and case hardening one in front occur simultaneously.

In order to insure better distribution of the air over the area of the plate, the headers are preferably mounted for a slight up and down movement. This is accomplished by the use of two pairs of eccentrics 99, 99 and 100, 100 carried by horizontal shafts 101, 101 and 102, 102. The shafts 101, 101 are provided with sprockets around which the drive chains 103 and 104 extend. These chains pass around suitable sprockets on the shaft 105 and are driven from the motor 106 through reduction gearing in the casing 107. The shafts 102, 102 are driven from the shafts 101, 101 by a pair of chains 102a, 102a passing around sprockets carried by the shafts.

After the case hardening operation, the bent sheets are carried step by step around to a position adjacent the racks 37 and 38, during which period their exposure to the atmosphere reduces their temperature to a point at which they can be removed from the gripping devices and placed upon the rack 38, at which time the steel plate 44 is straightened and one of the plates from the rack 37 is placed in the gripping devices.

Fig. 8 illustrates a slight modification in the bending device, such modification consisting in adding the bending plates 110 and 111 at the lower edge of the glass sheet, so that the glass is positively bent at the bottom of the sheet as well as at the top. These plates are moved in and out by the same mechanism which moves the plates 63, 64 and 65 heretofore described. In other respects, the construction is precisely the same as heretofore described.

Fig. 9 illustrates a further addition to the apparatus of Fig. 8. This addition consists in the use of an additional steel plate 112 similar to the plate 44, which plate is suspended from the lower edge of the glass sheet and acted upon by a pair of bending plates 113 and 114 similar in curvature to the bending plates 110 and 111. The plate 112 is supported from the lower edge of the glass sheet by gripping devices 115 which are the same as shown and described in connection with Figs. 3 and 7.

The apparatus may be operated automatically by the use of suitable electrical control mechanism, so that bending and chilling devices are operated at suitable intervals in step with a corresponding intermittent drive of the conveyor by its motor, in which case, the labor of the operators is limited to serving the conveyor by adding glass sheets thereto at the entrance end of the kiln and removing the bent sheets. The operation may also be made semi-automatic by the use of a push button or switch which requires actuation by the operator for each bending operation. Such automatic or semi-automatic control is a matter of routine for those skilled in electrical control equipment, and is, therefore, neither illustrated nor claimed herein.

What I claim is:

1. Apparatus for bending glass sheets, comprising an endless conveyor having a pair of vertical parallel flights, a series of supporting devices at spaced intervals longitudinally of the conveyor each provided with gripping means for the upper edge of one of the glass sheets which are to be bent so that the sheet hangs in a vertical plane, a tunnel kiln of inverted U shape which houses the upper portion of the conveyor, means for giving the conveyor an intermittent step by step movement to carry the sheets through the kiln, means for heating the kiln so that the glass sheets are brought to softening temperature during their travel through the kiln, curved presser means movable transversely of the kiln on the opposite sides of the glass sheets and means for moving the presser means so as to engage the sheets and bend them intermediate the movements of the conveyor.

2. Apparatus for bending glass sheets, comprising an endless conveyor having a pair of vertical parallel flights, a series of supporting devices at spaced intervals longitudinally of the conveyor each provided with gripping means for the upper edge of one of the glass sheets which are to be bent so that the sheet hangs in a vertical plane, a tunnel kiln of inverted U shape which houses the upper portion of the conveyor, means for giving the conveyor an intermittent step by step movement to carry the sheets through the kiln, means for heating the kiln so that the glass sheets are brought to softening temperature during their travel through the kiln, curved presser means movable transversely of the kiln on the opposite sides of the glass sheets, means for moving the presser means so as to engage the sheets and bend them intermediate the movements of the conveyor, and a set of air supply nozzles on each side of the plane of movement of the glass sheets adjacent the bending means for chilling the glass sheets after the bending operation.

3. Apparatus for bending glass sheets, comprising an endless conveyor having a pair of vertical parallel flights, a series of supporting devices at spaced intervals longitudinally of the conveyor each provided with gripping means for the upper edge of one of the glass sheets which are to be bent so that the sheet hangs in a vertical plane, a tunnel kiln of inverted U shape which houses the upper portion of the conveyor, means for giving the conveyor an intermittent step by step movement to carry the sheets through the kiln, means for heating the kiln so that the glass sheets are brought to softening temperature during their travel through the kiln, curved presser means movable transversely of the kiln at the lower end of the outlet section thereof on the opposite sides of the glass sheets and means for moving the presser means so as to engage the sheets and bend them intermediate the movements of the conveyor.

4. Apparatus for bending glass sheets, comprising an endless conveyor having a pair of vertical parallel flights, a series of supporting devices at spaced intervals longitudinally of the conveyor each provided with gripping means for the upper edge of one of the glass sheets which are to be bent, so that the sheet hangs in a vertical plane, a tunnel kiln of inverted U shape which houses the upper portion of the conveyor, means for giving the conveyor an intermittent step by step movement to carry the sheets through the kiln, means for heating the kiln so that the glass sheets are brought to softening temperature during their travel through the kiln, curved presser means at the lower end of the outlet section thereof on the opposite sides of the glass sheets, means for moving the presser means so as to engage the sheets and bend them intermediate the movements of the conveyor, and a set of air supply nozzles on each side of the plane of movement of the glass sheets beneath the bending means and exterior of the kiln for chilling the glass sheets.

5. Apparatus for bending glass sheets, comprising an endless conveyor having a pair of vertical parallel flights, a series of supporting devices at spaced intervals longitudinally of the conveyor each provided with gripping means for the upper edge of one of the glass sheets which are to be bent so that the sheet hangs in a vertical plane, a tunnel kiln of inverted U shape which houses the upper portion of the conveyor, means for giving the conveyor an intermittent step by step movement to carry the sheets through the kiln, means for heating the kiln so that the glass sheets are brought to softening temperature during their travel through the kiln, bending means movable transversely of the kiln on the opposite sides of the glass sheets, means for moving the bending means so as to engage the sheets and bend them intermediate the movements of the conveyor, closure means at each end of the kiln, and means for opening the closure means as the conveyor starts, and closing them as it stops.

6. Apparatus for bending glass sheets, comprising an endless conveyor having a pair of vertical parallel flights, a series of supporting devices at spaced intervals longitudinally of the conveyor each provided with gripping means for the upper edge of one of the glass sheets which are to be bent so that the sheet hangs in a vertical plane, a tunnel kiln of inverted U shape which houses the upper portion of the conveyor, the lower portion of the conveyor being in the open so that the glass sheets carried by such lower portion are exposed to the cooling action of the atmosphere outside the kiln, means for giving the conveyor an intermittent step by step movement to carry the sheets throught the kiln, means for heating the kiln so that the glass sheets are brought to softening temperature during their travel through the kiln, bending means movable transversely of the kiln on the opposite sides of the glass sheets and means for moving the bending means so as to engage the glass sheets and bend them intermediate the movements of the conveyor.

7. Apparatus for bending a glass sheet, comprising an overhead support, a metal plate carried by the support in a vertical plane and free to be bent relative to the support, means for suspending the glass sheet from the metal plate in the plane thereof, means for heating the plate and sheet until the glass reaches the softening point, and curved presser means on opposite sides of the plane of the sheet having a movement of approach and positioned so as to engage the plate and also the sheet along lines parallel to and adjacent the upper and lower edges of such sheet and bend the plate and sheet to the same curvature.

8. Apparatus for bending a glass sheet, comprising an overhead support, a metal plate carried by the support in a vertical plane and free to be bent relative to the support, means for suspending the glass sheet from the metal plate in the plane thereof, a second metal plate suspended from the lower edge of the glass sheet in the plane thereof, means for heating the glass sheet and the metal plates until the glass reaches the softening point, and curved presser means on opposite sides of the plane of the sheet having a movement of approach and positioned so as to engage the sheet and the plates and bend them to the same curvature.

WILLIAM OWEN.